United States Patent [19]

Bendler et al.

[11] 4,008,780
[45] Feb. 22, 1977

[54] DEVICE FOR TENSIONING SAFETY BELTS IN VEHICLES

[75] Inventors: Hellmut Bendler, Nurnberg; Heinz Gawlick, Furth; Egon Flach, Cologne-Riehl, all of Germany

[73] Assignee: Dynamit Nobel Aktiengesellschaft, Germany

[22] Filed: Nov. 2, 1973

[21] Appl. No.: 411,930

[30] Foreign Application Priority Data

Nov. 2, 1972  Germany ............................ 2253657

[52] U.S. Cl. .............................. 180/82 C; 280/745; 60/635
[51] Int. Cl.[2] ......................................... B60R 21/10
[58] Field of Search ......................... 180/82 C, 103; 280/150 SB, 744, 745, 746; 60/26.1, 635; 267/162

[56] References Cited
UNITED STATES PATENTS

| | | | |
|---|---|---|---|
| 2,994,563 | 8/1961 | Ruggiero | 60/26.1 X |
| 3,024,592 | 3/1962 | Leaman | 60/26.1 X |
| 3,077,324 | 2/1963 | Strickland | 60/26.1 X |
| 3,178,136 | 4/1965 | Bayer | 244/122 |
| 3,559,400 | 2/1971 | Kleiner et al. | 60/26.1 |
| 3,610,606 | 10/1971 | Andrews | 267/162 |
| 3,871,470 | 3/1975 | Schwanz et al. | 180/82 C |

*Primary Examiner*—Kenneth H. Betts
*Attorney, Agent, or Firm*—Craig & Antonelli

[57] ABSTRACT

Device for tensioning safety belts in vehicles in which one end of the safety belt is securable to the vehicle and the other end of the belt is securable to the tensioning device. The device includes a cylinder having a piston with a piston rod extending from one side of the piston out of the cylinder to which the safety belt is securable. The piston is provided with a recess receiving an electrically ignitable propellant charge cartridge such that upon ignition of the cartridge propellant gases are generated which flow into the cylinder at the piston rod side of the piston for causing the piston and piston rod to be displaced into the cylinder to effect a tensioning of the safety belt.

16 Claims, 1 Drawing Figure

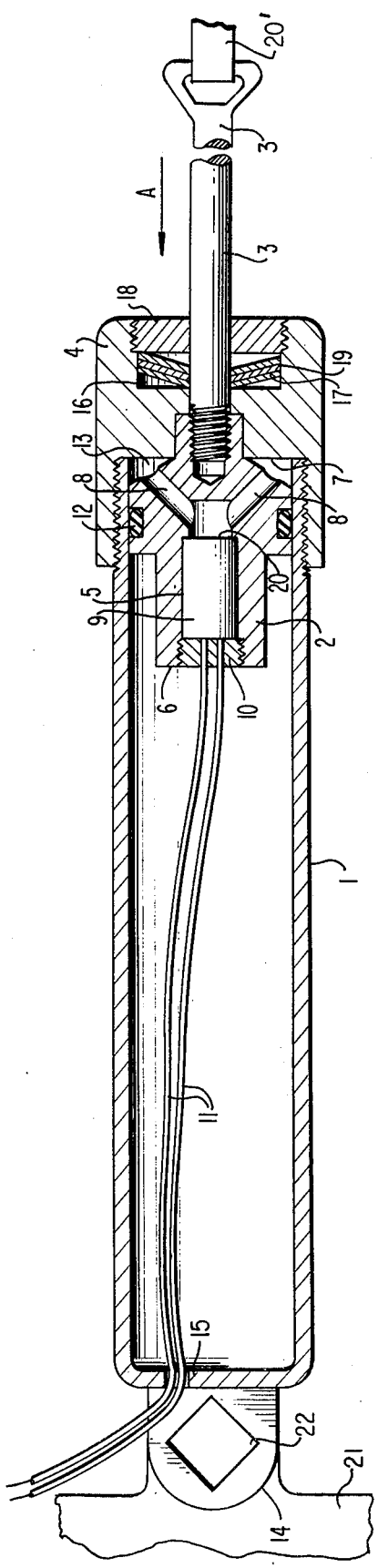

DEVICE FOR TENSIONING SAFETY BELTS IN VEHICLES

The present invention relates to a device for tensioning safety belts in vehicles.

German Patent Application P 21 21 101.8, which corresponds to U.S. Patent Application Serial No. 249,150, filed May 1, 1972 now U.S. Pat. No. 3,845,836 and assigned to the assignee of the present invention, the disclosure of which is incorporated by reference, relates to a safety belt for vehicles, especially automotive vehicles, which belt is in operative connection with a tensioning device actuated by a trigger member responding when a predetermined deceleration value has been exceeded.

As has been demonstrated in experiments for increasing passenger safety in accidents, the safety belts offer their maximum protection if the persons are strapped tightly into these belts. Since, as experience has shown, the safety belts are, in practice, generally not appropriately tightly tensioned by the passengers when the belts are put on, the tensioning device of the invention is provided which tightens the safety belt sufficiently at the instant of a collision.

In accordance with the report by H. P. Willumeit, "Passive Preloaded Energy-Absorbing Seat Belt System", 2nd International Conference on Passive Restraints, Detroit, Michigan, May 22-25, 1972, issued as Paper No. 720433 by the Society of Automotive Engineers, Inc., Two Pennsylvania Plaza, New York, N.Y. 10001, a tensioning device has been known for this purpose comprising a cylinder and a piston with piston rod displaceably arranged in the cylinder. The end of the piston rod extending out of the cylinder is in operative connection with the safety belt. A lateral connecting pipe is provided between the piston and that end of the cylinder where the piston rod emerges, and a propellant charge cartridge to be ignited electrically is disposed in this connecting pipe.

If, upon the passing of a predetermined deceleration value, the ignition of the propellant charge cartridge is initiated by an appropriate triggering means, then the piston is displaced under the pressure effect of the propellant gases flowing into the cylinder, the piston rod is retracted, and thus the belt is tensioned. In order to limit the tensioning force to a tolerable measure for the passengers, a belt force limiter and/or damping element is suitably interposed. The retracted piston rod is retained in its end position by means of a locking device fashioned as a double cone. Of course, this tensioning device can also begin functioning if, for example, a predetermined maximally permissible acceleration value is exceeded in the front vehicle due to the rearward impact of a following vehicle, if the triggering means responds not only to decelerations, but also to accelerations.

A disadvantage inherent in this tensioning device, which is arranged to be freely accessible in the vehicle, is the lateral location of the propellant charge cartridge, since the latter can readily be damaged unintentionally or can also be removed on purpose by unauthorized persons, so that the safe functioning of the tensioning device is not ensured under all circumstances.

It is therefore an object of the present invention to provide a tensioning device which overcomes the aforementioned disadvantage. That is, to construct the apparatus for tensioning safety belts in vehicles, with a cylinder and a piston with piston rod displaceable therein, which piston rod can be retracted into the cylinder under the pressure effect of a reacting, electrically ignited propellant charge cartridge, in such a manner that its flawless functioning is safely ensured even in case of very rough treatment and so that intentional but improper alterations are at least made considerably more difficult.

According to the invention, the provision is made for this purpose to arrange the propellant charge cartridge in a recess provided in the piston so that the propellant gases can flow into the cylinder on the side of the piston rod. Due to this safe and protected accommodation of the propellant charge cartridge in the piston proper — i.e. in the interior of the tensioning device — any damage to the propellant charge cartridge is reliably excluded, even in case of very rough stresses, as they occur, for example, in construction trucks or military vehicles. Also, unauthorized persons cannot readily remove the propellant charge cartridge.

The recess can be provided so that it begins at the piston rod side of the piston and extends over part of the height of the piston. The electric leads to the propellant charge cartridge can be extended conventionally through the end of the cylinder on the piston rod side so that they are sealed gastight. The maximally possible diameter of the recess and thus also of the propellant charge cartridge is, however, relatively restricted by the spacing between the piston rod and the rim of the piston. In order to be able to utilize, if necessary, propellant charge cartridges which are even of a larger diameter, a suitable feature of the present invention provides that the recess emanates from the side of the piston facing away from the piston rod and is connected with the piston rod side of the piston through at least one gas discharge duct. Preferably, with a view toward a maximally symmetrical construction of the piston, two or more gas discharge ducts are arranged in uniform distribution, which ducts exit laterally beside the piston rod which is, for example, threadedly connected with the piston.

The propellant charge cartridge which is to be ignited electrically is connected to the triggering means via at least one electric lead. One lead is sufficient if the electric primer element arranged in the propellant charge cartridge has a ground connection so that the electric current can flow via the case of the propellant charge cartridge, the tensioning device, etc. With a view toward a maximally secure electric contacting action, it is, however, preferable to provide two separate electric leads for the propellant charge cartridge. In order to reliably avoid any damage to these leads, the latter must be installed outside of the tensioning device so that they are enclosed. This is accomplished in a particularly simple manner if, according to another suggestion of the present invention, the at least one electric lead to the propellant charge cartridge is extended out of the cylinder on the cylinder mounting end oppositely to the piston rod through a corresponding bore, since in this case the lead can be passed directly through the element provided at this point for mounting the tensioning device to the car body and can be extended into the hollow space of the car body. Thus, only a relatively small cover cap is necessary at the mounting end of the tensioning device in order to avoid direct access to the lead.

In accordance with the present invention, the provision is furthermore made, for locking the retracted piston rod, to construct the locking arrangement as at least one cup spring pushed onto the piston rod and resting with its outer rim facing away from the piston within the cylinder.

These and further objects, features and advantages of the present invention will become more obvious from the following description when taken in connection with the accompanying drawing which shows, for purposes of illustration only, a single embodiment in accordance with the present invention, and wherein the single FIGURE is a longitudinal sectional view of a tensioning device in accordance with the present invention.

Referring now to the FIGURE, the tensioning device in accordance with the present invention includes a cylinder 1 having a piston 2 with a piston rod 3 threadedly inserted in the piston, the piston and the rod being arranged for axial displacement. The piston rod 3 is extended through a screw cap 4 which closes off one end of the cylinder 1 and has, for example a D-shaped end to which one end of a belt 20' is secured. The piston 2 is provided with a recess 5 starting at the side 6 of the piston 2 facing away from the piston rod 3 and in communication with the piston rod side 7 of the piston 2 via two gas discharge ducts 8 which open into a pressure chamber 13. An electrically ignitable propellant charge cartridge 9 is inserted in the recess 5 and is held therein by means of a screw closure 10, through which the two electric leads 11 are extended. In order to keep the friction between the piston 2 and the cylinder 1 at a minimum, the piston 2 has a reduced outer diameter in the zone of the recess 5. An annular sealing element 12 ensures the required seal between piston 2 and cylinder 1. Of course, the other connections and ducts are likewise fashioned so that the required gas-tight construction of the pressure chamber 13 is provided. The leads 11 are extended through the bore 15 at the mounting end 14 of the cylinder 1. The mounting end 14 is for example secured to a bracket portion 21 of the vehicle by a bolt 22.

As shown, cup springs 17 are arranged in the screw cap 4 within a recess 16 and are held by means of a threaded connection 18. The cup springs 17 contact each other with their annular surfaces and are pushed sufficiently tightly onto the piston rod 3 so that they face away from the piston 2 with their outer rim 19. In this case, the springs permit a movement of the piston rod 3 in the direction of arrow A, but not in the opposite direction, i.e. they arrest or lock the piston rod 3 in its retracted position within the cylinder 1.

The initial size of the pressure chamber 13 is determined in dependence on the propellant of the propellant charge cartridge 9 and its reaction time so that undesired gas pressure peaks are avoided. A suitable propellant is, for example, an ignitable mixture as described in DOS 1,646,313. This mixture is accommodated, together with one of the conventional electric primers, in a case of metal or a synthetic resin. In case of very high requirements regarding functional safety, it is also possible to provide optionally two primer elements. Depending on the design of the propellant charge cartridge, the entire chronological course of the tensioning procedure can be predetermined in accordance with the requirements.

The functioning of the tensioning device is essentially as follows: After ignition of the propellant charge cartridge 9, the cartridge is torn open at the bottom 20 and the propellant gases flow through the ducts 8 into the pressure chamber 13 and displace the piston 2 with the piston rod 3 in the direction of arrow A. As soon as the force exerted on the piston 2 by the propellant gas is in equilibrium with the belt tensioning force effective on the piston rod 3, the piston 2 and the piston rod 3 are arrested in their movement. In this position, the piston rod 3 is secured by means of the cup springs 17, so that the rod cannot be pulled out if the passengers of the vehicle stress the belt beyond the belt tensioning force at a corresponding acceleration and/or deceleration. The entire tensioning procedure preferably takes place within a few milliseconds.

While We have shown and described one embodiment in accordance with the present invention, it is understood that the same is not limited thereto but is susceptible of numerous changes and modifications as known to a person skilled in the art, and We therefore do not wish to be limited to the details shown and described herein but intend to cover all such changes and modifications as are obvious to one of ordinary skill in the art.

What we claim is:

1. Device for tensioning safety belts in vehicles in which one end of the safety belt is securable to the vehicle and the other end of the belt is securable to the tensioning device, said device comprising cylinder means, piston means having piston rod means extending from one side thereof, said piston means and said piston rod means being arranged for displacement within said cylinder means, said piston means being provided with centrally disposed recess means for receiving an electrically ignitable propellant charge cartridge and at least two symmetrically disposed discharge ducts in said piston means connected with said recess means and directed outwardly from said recess means toward the adjacent end wall of said cylinder means at said piston rod means side of said piston means such that upon ignition of the cartridge propellant gases are generated which flow through said discharge ducts into said cylinder means at said piston rod means side of said piston means and against the adjacent end wall of said cylinder means for causing said piston means and said piston rod means to be displaced into said cylinder means to effect a tensioning of the safety belt.

2. Device according to claim 1, wherein said piston rod means extends outwardly from one end of said cylinder means, said piston means and said cylinder means delimiting pressure chamber means into which the propellant gases flow for causing displacement of said piston means and said piston rod means away from the one end of said cylinder means.

3. Device according to claim 2, wherein said piston means is positioned proximate to the one end of said cylinder means in the untensioned condition of the safety belt.

4. Device according to claim 1, wherein said recess means begins at the side of said piston means facing away from the piston rod means side thereof and extends partly over the height of said piston means.

5. Device according to claim 4, further comprising a propellant charge cartridge disposed in said recess means.

6. Device according to claim 1, wherein said piston means is completely disposed within said cylinder means for all operating positions of said piston means.

7. Device according to claim 1, wherein said piston means is disposed within said cylinder means and is responsive to the generation of propellant gases for movement only within said cylinder means.

8. Device according to claim 1, wherein said recess means of said piston means is arranged so as to normally be inaccessible from outside the tensioning device.

9. Device according to claim 1, further comprising locking means for locking said piston rod means in the displaced position thereof within said cylinder means.

10. Device for tensioning safety belts in vehicles in which one end of the safety belt is securable to the vehicle and the other end of the belt is securable to the tensioning device, said device comprising cylinder means, piston means having piston rod means extending from one side thereof, said piston means and said piston rod means being arranged for displacement within said cylinder means, said piston means being provided with centrally disposed recess means for receiving an electrically ignitable propellant charge cartridge and at least two symmetrically disposed discharge ducts connected with said recess means such that upon ignition of the cartridge propellant gases are generated which flow through said discharge ducts into the cylinder means at the piston rod means side of the piston means for causing said piston means and said piston rod means to be displaced into said cylinder means to effect a tensioning of the safety belt, said recess means beginning at the side of said piston means facing away from the piston rod means side therof and extending partly over the height of said piston means, a propellant charge cartridge disposed in said recess means, said cylinder means being a substantially closed cylinder having said piston rod means extending outwardly through one end thereof, the safety belt being securable to said piston rod means, said cylinder having a mounting means at the end of said cylinder opposite to the piston rod means and of said cylinder, the mounting means end of said cylinder having a bore therethrough, and at least one electric lead for igniting said propellant charge cartridge extending from said propellant charge cartridge through said cylinder and outwardly of said cylinder through said bore.

11. Device according to claim 10, wherein said at least one electric lead is arranged for connection with a sensing means for providing an electrical signal for igniting said propellant charge cartridge when a predetermined sensed value is exceeded.

12. Device according to claim 10, further comprising locking means for locking said piston rod means in the displaced position thereof within said cylinder.

13. Device according to claim 12, wherein said locking means comprises at least one cup spring mounted on said piston rod means in engagement therewith and having its outer rim positioned away from said piston means and resting against said cylinder so as to permit movement of said piston rod means in only one direction within said cylinder.

14. Device according to claim 13, wherein said cylinder includes a cap member for closing the piston rod means end thereof and through which said piston rod means extends, said cap member being provided with a recess for receiving said at least one cup spring therein.

15. Device for tensioning safety belts in vehicles in which one end of the safety belt is securable to the vehicle and the other end of the belt is securable to the tensioning device, said device comprising cylinder means, piston means having piston rod means extending from one side thereof, said piston means and said piston rod means being arranged for displacement within said cylinder means, said piston means being provided with centrally disposed recess means for receiving an electrically ignitable propellant charge cartridge and at least two symmetrically disposed discharge ducts connected with said recess means such that upon ignition of the cartridge propellant gases are generated which flow through said discharge ducts into the cylinder means at the piston rod means side of the piston means for causing said piston means and said piston rod means to be displaced into said cylinder means to effect a tensioning of the safety belt, and locking means for locking said piston rod means in the displaced position thereof within said cylinder means, said locking means comprising at least one cup spring mounted on said piston rod means in engagement therewith and having its outer rim positioned away from said piston means and resting against said cylinder means so as to permit movement of said piston rod means in only one direction within said cylinder means.

16. Device according to claim 15, wherein said recess means begins at the side of said piston means facing away from the piston rod means side of said piston means and extends partly over the height of said piston means.

* * * * *